United States Patent Office 2,953,561
Patented Sept. 20, 1960

2,953,561

NITROSTYRYL DYE BASES AND VINYLOGS THEREOF DERIVED FROM 2-CYANOMETHYLAZOLES

Norman J. Doorenbos, Glen Burnie, Md., assignor to General Aniline & Film Corporation, New York, N.Y., a corporation of Delaware No Drawing. Filed Sept. 24, 1957, Ser. No. 685,808

6 Claims. (Cl. 260—240)

This invention relates to nitrostyryl dyes and vinylogs thereof derived from 2-cyanomethylazoles and to a process for preparing same.

It is known that styryl dye bases can be prepared by elimination of alkyl halide from the styryl dye salts and in this connection reference is made to U.S. Patent 2,169,434. The method thereof comprises heating the styryl dye salts in a high boiling tertiary amine such as diethylaniline wherein the styryl dye is dequaternized to to yield the styryl base.

It is further known that styryl bases may be synthesized directly by condensing a benzaldehyde with a heterocyclic ring system containing a reactive methylene group in the 2- or 4-position.

I have now found that styryl bases and their higher vinylogs can be produced by reacting a heterocyclic base having a 2- or 4-cyanomethyl group with a nitrobenzaldehyde or higher vinylog thereof in the presence of a basic condensing agent.

The resulting new styryl bases are excellent desensitizers for the production of direct positive photographic emulsions and in this connection reference is made to the application of Dersch and Doorenbos filed on even date herewith and entitled, "Direct Positive Photographic Emulsion," Serial Number 685,817.

The aforesaid styryl bases and the preparation of the same constitute the aim and purpose of this invention.

The styryl dye bases contemplated herein can be represented by the following general formula:

I.

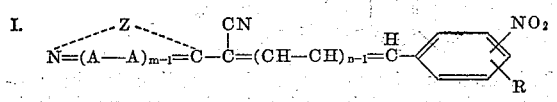

wherein R is hydrogen, halogen, i.e., chlorine, bromine, etc.; hydroxy, amino, nitro, etc.; $n$ is an integer of from 1 to 2, $m$ is an integer of from 1 to 2, A is a methine group and Z represents the non-metallic atoms necessary to complete a heterocyclic nucleus containing 5 to 6 atoms in the ring such as benzimidazole, 3-alkylbenzimidazole, e.g., 3-methyl-, 3-ethyl-, 3-propyl-, 3-butylbenzimidazole, 2- and 4-pyridine, 2- and 4-quinoline, thiazole, benzothiazole, α- and β-naphthothiazole, oxazole, benzoxazole, selenazole, benzoselenazole, 3,3-dialkylindolenine, e.g., 3,3-dimethylindolenine, 3,3,5-trimethylindolenine, wherein said heterocyclic nuclei can contain such substituents as halogen, e.g., chlorine, bromine, etc.; hydroxy, amino, nitro, etc.

I prepare the styryl dye bases of Formula I by condensing a heterocyclic base having a 2- or 4-cyanomethyl group as represented by the following formula:

II.

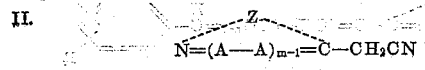

wherein Z, A and $m$ have the values set forth above with a benzaldehyde containing at least one nitro group in the phenyl ring. Various substituted nitrobenzaldehydes can be reacted with the compounds of Formula II of which the following list is typical.

o-Nitrobenzaldehyde
m-Nitrobenzaldehyde
p-Nitrobenzaldehyde
2,4-dinitrobenzaldehyde
3,4-dinitrobenzaldehyde
4-chloro-2-nitrobenzaldehyde
4-bromo-2-nitrobenzaldehyde
3-chloro-4-nitrobenzaldehyde
3-hydroxy-2-nitrobenzaldehyde
4-amino-2-nitrobenzaldehyde
4-chloro-3-nitrobenzaldehyde
5-chloro-2-nitrobenzaldehyde
3-hydroxy-4-nitrobenzaldehyde The condensations for preparing the aforesaid styryl dye bases are advantageously carried out in the presence of a basic catalyst (acid binding agent) such as a tertiary organic amine of the trialkylamine type, i.e., trimethylamine, triethylamine, tri-n-propylamine, etc.; a secondary organic amine, i.e., piperidine, pyrrolidine, etc.; and mineral alkalines, i.e., sodium or potassium carbonate. Solvents that can be advantageously used include the lower alcohols of the formula: $C_nH_{2n+1}OH$, wherein $n$ is a positive integer of from 1 to 4.

The requisite azoleacetonitrile intermediates are prepared according to methods reported in the chemical literature. The syntheses of 2- and 4-cyanomethylquinolines are described by P. Jungmann in Angew. Chem., 60A, 72 (1948), wherein N-methyl-N-cyanoaniline is reacted with quinaldine or lipidine in the presence of NaNH$_2$—NaNHMePh catalysts to produce 2- or 4-quinaldineacetonitrile. To prepare pyridineacetonitriles, 2- or 4-pyridineacetamide is heated with phosphorous pentoxide to yield the corresponding nitrile derivative. Other azoleacetonitriles are obtained by reacting an aromatic amine of the following formula:

HZ—A—NH$_2$ wherein A represents an aromatic radical of the benzene or naphthalene series and Z is O, S, Se or RN wherein R is hydrogen, alkyl, i.e., methyl, ethyl, propyl, butyl, etc.; or aryl, i.e., phenyl, naphthyl, etc.; the HZ— group always being ortho to the amino group with ethyl cyanoacetate. Thus, 2-benzimidazoleacetonitrile is prepared by heating o-phenylenediamine with ethyl cyanoacetate according to the method of Copeland and Day as disclosed in J.A.C.S., 65, 1072 (1943).

The following examples will serve to further illustrate the invention but it is understood that the invention is not restricted thereto.

EXAMPLE I 2-(α-cyano-p-nitrostyryl)benzimidazole

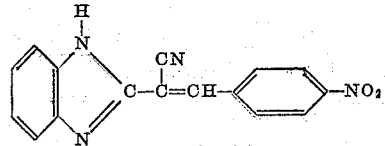

To a solution of 1.57 g. (0.01 mole) of 2-benzimidazoleacetonitrile and 1.51 g. (0.01 mole) of p-nitrobenzaldehyde in 20 ml. of ethanol was added 1 ml. of piperidine. The mixture was refluxed for 1 hour. A yellow dye began to precipitate shortly after the mixture began to reflux. The mixture was cooled, filtered, washed with ether, and the crude dye crystallized from a dimethylformamide ether mixture. The yield was 1.08 g. and melted at 341–350° C., maximum absorption below 400 mμ.

EXAMPLE II

5(6)-chloro-2-(α-cyano-m-nitrostyryl)benzimidazole

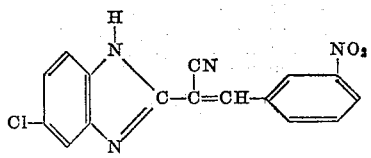

To a solution of 1.92 g. (0.01 mole) of 5(6)-chloro-2-benzimidazoleacetonitrile and 1.51 g. (0.01 mole) of m-nitrobenzaldehyde in 20 ml. of ethanol was added 1 ml. of piperidine. The mixture was refluxed for 1 hour. A yellow dye began to precipitate shortly after the mixture began to reflux. The mixture was cooled and the product filtered, washed with ether and boiled twice with methanol, cooled, filtered and dried. The yield was 1.05 g. and melted at 308–311° C., maximum absorption below 400 mμ.

EXAMPLE III 2-(α-cyano-m-nitrostyryl)benzimidazole

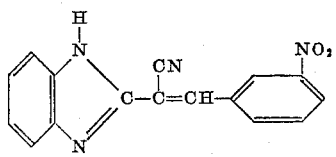

To a solution of 3.7 g. (0.025 mole) of 2-benzimidazoleacetonitrile and 3.8 g. (0.025 mole) of m-nitrobenzaldehyde in 40 ml. of absolute ethanol was added 10 drops of triethylamine. The mixture was refluxed for 1 hour, cooled and the solid filtered off and recrystallized from acetonitrile. The yield was 1.68 g. and melted at 263–268° C., maximum absorption below 400 mμ.

EXAMPLE IV 2-(α-cyano-p-nitrostyryl)-5(6)-methylbenzimidazole

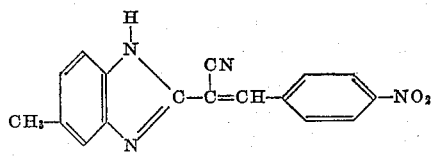

To a solution of 1.71 g. (0.01 mole) of 5(6)-chloro-2-benzimidazoleacetonitrile and 1.51 g. (0.01 mole) of p-nitrobenzaldehyde in 30 ml. of methanol was added 1 ml. of piperidine. A yellow dye formed immediately and separated on heating. The mixture was heated for 30 minutes, cooled and filtered. The solid was washed with ether and crystallized from dioxane. The yield was 1.5 g. and melted at 265–270° C., maximum absorption below 400 mμ.

EXAMPLE V 2-(α-cyano-m-nitrostyryl)-5(6)-methylbenzimidazole

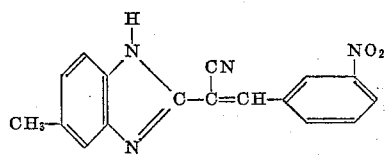

This dye was prepared in the manner described in Example IV on a 0.01 molar scale with m-nitrobenzaldehyde being substituted for p-nitrobenzaldehyde. The yield was 2.1 g.

EXAMPLE VI

2-[1-cyano-4-(o-nitrophenyl)-1,3-butadienyl]-5(6)-methylbenzimidazole

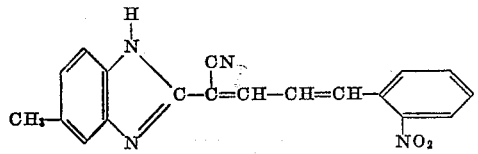

To a solution of 1.0 g. of o-nitrocinnamaldehyde and 1.0 g. of 5(6)-methyl-2-benzimidazoleacetonitrile in 20 ml. of methanol was added 0.5 ml. of piperidine. The solution was re-fluxed for 10 minutes. It was cooled and the product filtered off triturated with hot isopropyl alcohol, washed with ether and dried. The yield was 1.1 g.

EXAMPLE VII 2-(α-cyano-p-nitrostyryl)-5(6)-methoxybenzimidazole

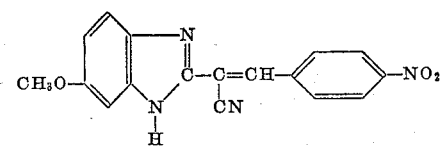

1.87 grams of 5(6)-methoxy-2-benzimidazoleacetonitrile and 1.51 g. of p-nitrobenzaldehyde were dissolved in 10 ml. of methanol, at which point 5 drops of piperidine were added. A dye separated out almost immediately. The mixture was then heated to boiling and refluxed for 3 minutes. The crude dye was filtered from the hot solution, followed by washing with ether. The yield was 3.5 g. The crude dye was crystallized from glacial acetic acid.

EXAMPLE VIII 2-(α-cyano-p-nitrostyryl)pyridine

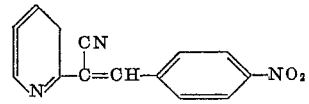

This compound was prepared according to the procedure of Example I but using 2-pyridineacetonitrile in place of 2-benzimidazoleacetonitrile.

EXAMPLE IX 2-(α-cyano-p-nitrostyryl)quinoline

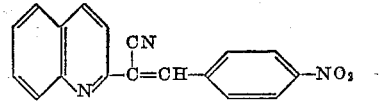

This compound was prepared according to the procedure of Example I but using 2-quinolineacetonitrile in place of 2-benzimidazoleacetonitrile.

EXAMPLE X 2-(α-cyano-p-nitrostyryl)benzothiazole

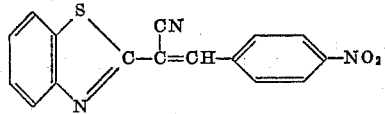

This compound was prepared according to the procedure of Example I but using 2-benzothiazoleactonitrile in place of 2-benzimidazoleacetonitrile.

I claim:
1. A polymethine compound of the following general formula:

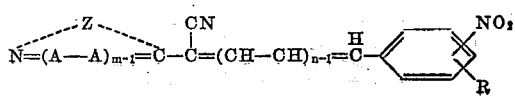

wherein R is selected from the class consisting of hydrogen, halogen, hydroxy, amino and nitro groups, $n$ represents an integer of from 1 to 2, $m$ represents an integer of from 1 to 2, A represents a methine group and Z is a residue selected from the class consisting of benzimidazole, benzothiazole, pyridine and quinoline nuclei.

2. A polymethine compound of the following formula:

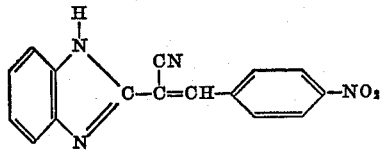

3. A polymethine compound of the following formula:

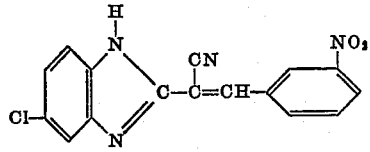

4. A polymethine compound of the following formula:

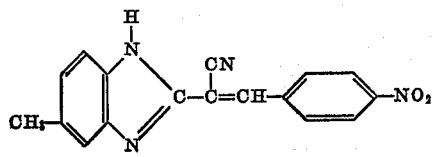

5. A polymethine compound of the following formula:

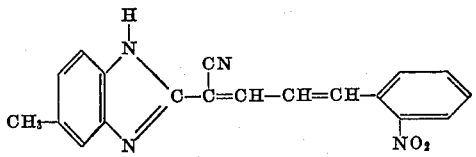

6. A polymethine compound of the following formula:

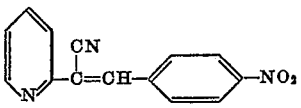

References Cited in the file of this patent

UNITED STATES PATENTS

| | | |
|---|---|---|
| 2,255,077 | Middleton | Sept. 9, 1941 |
| 2,345,094 | Brooker et al. | Mar. 28, 1944 |
| 2,669,515 | Kendall et al. | Feb. 16, 1954 |
| 2,794,802 | Horwitz | June 4, 1957 |

FOREIGN PATENTS

| | | |
|---|---|---|
| 824,818 | Germany | July 8, 1949 |

OTHER REFERENCES

Mees: The Theory of The Photographic Process, p. 1046, The Macmillan Co., New York (1942).